United States Patent [19]

Dumovich

[11] 4,144,657
[45] Mar. 20, 1979

[54] TEACHING AID FOR MATHEMATICS AND NUMBER SYSTEMS

[76] Inventor: Matt J. Dumovich, 2151 Illion St., San Diego, Calif. 92110

[21] Appl. No.: 838,076

[22] Filed: Sep. 30, 1977

[51] Int. Cl.² ............................................. G09B 19/02
[52] U.S. Cl. ................................................. 35/31 D
[58] Field of Search .................. 35/31 R, 31 B, 31 D, 35/31 E, 31 F, 31 G, 32, 33, 69, 70, 71, 72, 73

[56] References Cited

U.S. PATENT DOCUMENTS

| | | | |
|---|---|---|---|
| 356,167 | 1/1887 | Shannon | 35/31 F X |
| 2,482,658 | 9/1949 | Culp | 35/31 E |
| 2,494,469 | 1/1950 | Booth | 35/31 D |
| 2,835,988 | 5/1958 | Hilkene | 35/31 D |
| 2,926,432 | 3/1960 | Helberg | 35/31 R |
| 3,002,295 | 10/1961 | Armstrong | 35/70 X |
| 3,229,388 | 1/1966 | Smith | 35/70 |
| 3,248,804 | 5/1966 | Jorgens | 35/31 D |
| 3,410,002 | 11/1968 | Mulholland et al. | 35/31 R |
| 3,414,986 | 12/1968 | Stassen | 35/70 X |
| 3,708,892 | 1/1973 | Graf | 35/31 D |
| 3,760,165 | 9/1973 | Marcks | 35/31 D X |

FOREIGN PATENT DOCUMENTS

| | | | |
|---|---|---|---|
| 725755 | 2/1932 | France | 35/31 D |
| 1042404 | 6/1953 | France | 35/31 B |
| 1226055 | 3/1971 | United Kingdom | 35/31 R |

*Primary Examiner*—William H. Grieb
*Attorney, Agent, or Firm*—Brown & Martin

[57] ABSTRACT

An educational system for teaching or aiding in the teaching of mathematics and number systems, and numerical and dimensional relationships comprises a base member having a plurality of parallel extending tracks, each track divided into different units of one or more number systems, such as metric system and the English measurement systems. The divisions of the respective tracks are both visual and tactual and a plurality of different indicators are available for indicating points or numerical values on the various scales. A plurality of dimensioned blocks of the various dimensions utilized in the system are provided for manipulation in conjunction with the various tracks for not only visual but tactual sensing of numerical values, dimensions and relative values.

9 Claims, 8 Drawing Figures

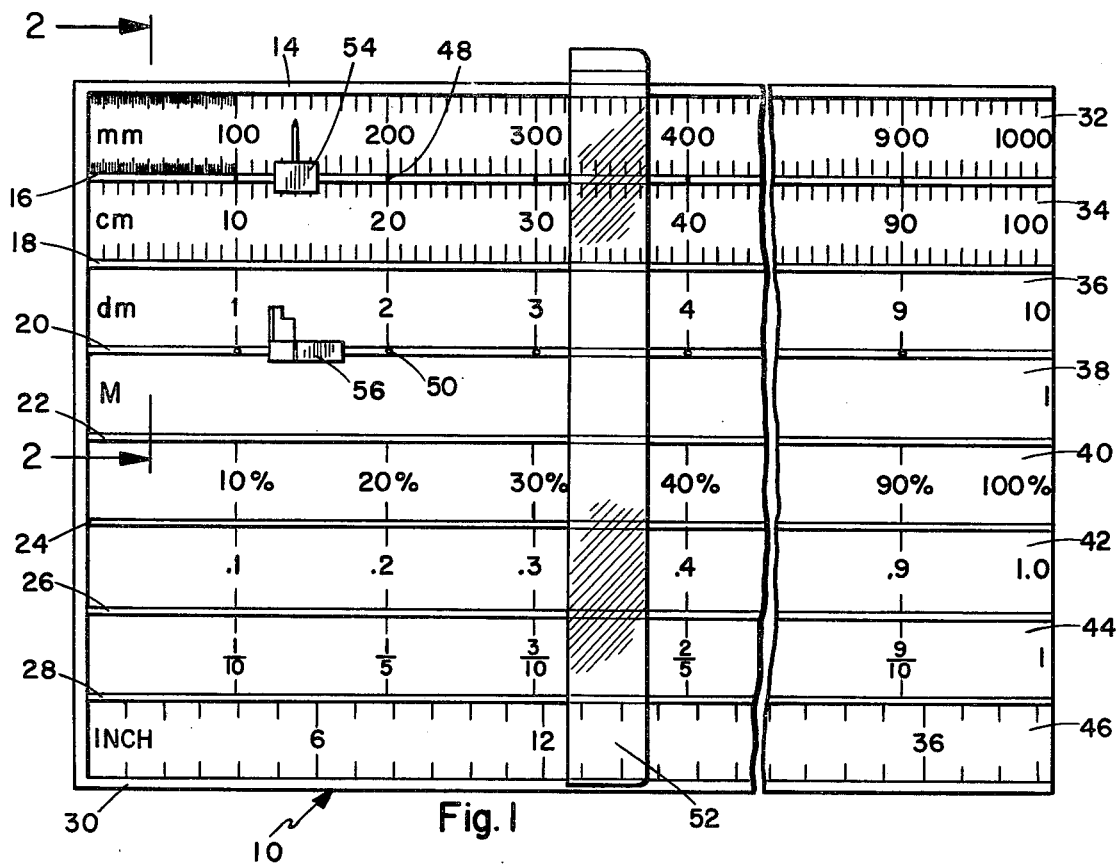
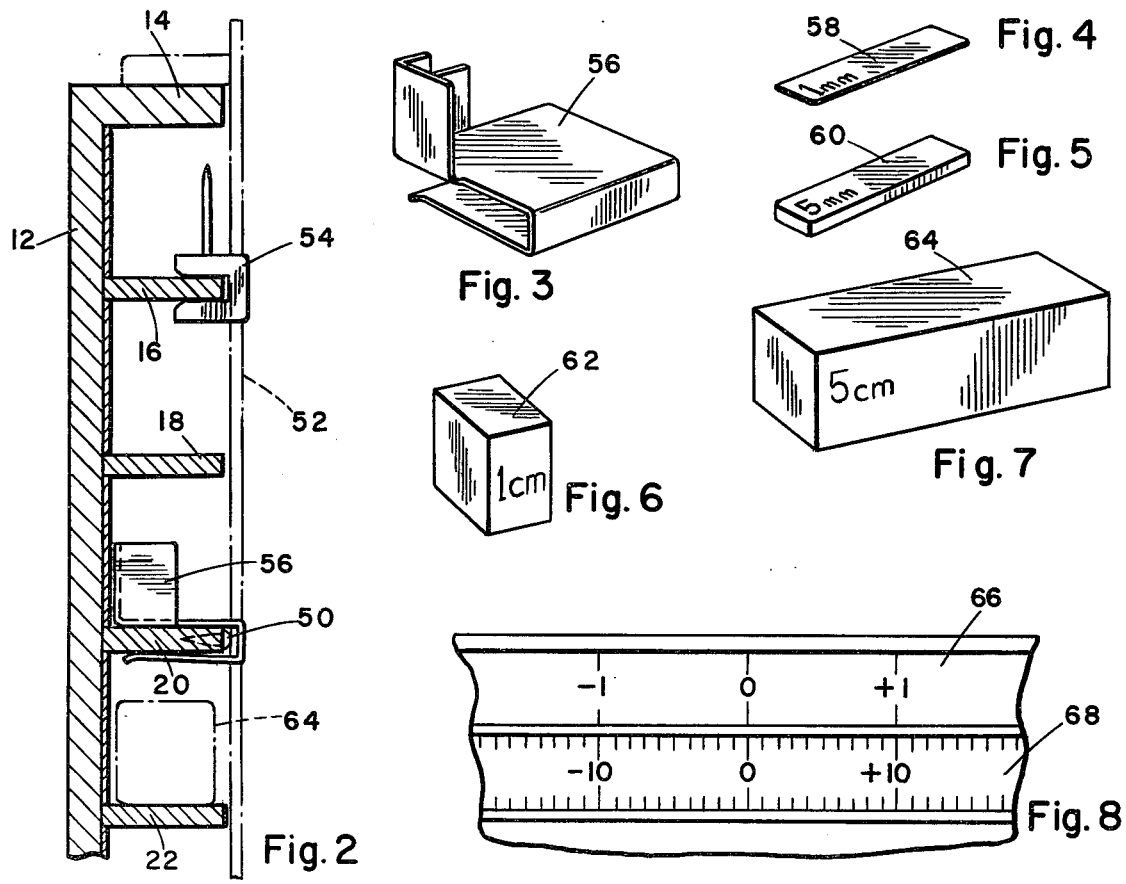

TEACHING AID FOR MATHEMATICS AND NUMBER SYSTEMS

BACKGROUND OF THE INVENTION

The present invention relates to teaching aids and pertains particularly to an aid for teaching numerical and mathematic concepts and relationships.

The teaching of numerical systems, numerical relationships, mathematics and the like is greatly enhanced by the use of visual and tactual aids. Many teaching aids have been proposed for the teaching of mathematics and/or numerical relationships. The prior art approaches, however, have numerous drawbacks in that they are either overly simplified in being directed to the teaching of a single concept or overly complicated.

The use of visual aids for arithmatic computation wherein blocks of a length related to the logarithms of numbers to the base 10 are used for teaching multiplication are shown in U.S. Pat. No. 2,835,988. In this patent, a track for receiving the various blocks is marked with indicia representing the multiplication of the numerical values of two or more blocks within the track. This disclosure, however, is limited to the single concept.

Another educational device wherein a plurality of blocks are used having a length representative of the numerical value of from one to 10 is disclosed in U.S. Pat. No. 3,229,388. This apparatus is very limited in its application.

Another similar disclosure is that in U.S. Pat. No. 3,410,002, wherein the addition of numbers is taught. Various blocks of numerical value having lengths and colors representative of particular numbers are fitted within tracks also having numerical values and the arrangement is such that mathematical addition may be achieved.

The use of blocks symbolic of values in either a three dimensional or a two dimensional arrangement for the purpose of teaching addition and the like is disclosed in U.S. Pat. No. 3,414,986. In this arrangement a plurality of blocks of cubic size proportioned to a number fixed thereon are mounted on open base members having a plurality of mounting surfaces. The total volume of any particular block or arrangement of blocks is related to the numerical value, thus addition and subtraction may be taught.

Another device of somewhat similar concept is shown in U.S. Pat. No. 3,708,892, wherein blocks are stacked in a vertical arrangement relative to linear values. Another device for teaching number concepts is shown in U.S. Pat. No. 3,002,295, wherein a backboard with a plurality of numbers of rows is utilized on conjunction with a plurality of blocks, each numbered in order to teach number concepts. This device however, again, is limited in its application. Another teaching aid is shown in U.S. Pat. No. 3,248,804, which discloses a visual aid including an assembly of moveable blocks with indicia representing numerical values. The board presents various combinations including zero with a plurality of blocks having indicator, such as a button on the top thereof, indicating the numerical value of the block. A divider is provided for placing between respective blocks which go to add up to a particular numerical value. All of these systems as pointed out above are limited to very simple numerical relationships and mathematical concepts.

It is therefore desirable that some system be available for teaching multiple numerical relationships and the relationship of various measuring and numerical systems.

SUMMARY AND OBJECTS OF THE INVENTION

Accordingly, it is the primary object of the present invention to overcome the above problems of the prior art.

Another object of the present invention is to provide an educational system for quickly and easily teaching the relationship between numerical values and mathematical concepts.

A further object of the present invention is to provide a teaching aid that is capable of illustrating the relationship between multiple units of measure and at the same time provide visual as well as tactual stimulus to the educational process.

In accordance with the primary aspect of the present invention, a teaching aid includes multiple tracks of equal length extending parallel and provided with units of division and multiple and varied indicia means for indicating the various numerical relationships within as well as relationships between the various systems.

BRIEF DESCRIPTION OF THE DRAWING

The above and other objects and advantages of the present invention will become apparent from the following description when read in conjunction with the drawings, wherein:

FIG. 1 is a front elevational view of the apparatus of the present invention.

FIG. 2 is an enlarged sectional view taken on line 2—2 of FIG. 1.

FIG. 3 is a perspective view of a moveable marker.

FIGS. 4 through 7 illustrate various dimensional blocks used with the apparatus.

FIG. 8 illustrates a portion of an alternative scale arrangement to indicate positive and negative values.

DETAILED DESCRIPTION OF A PREFERRED EMBODIMENT

Turning now to the drawing, particularly to FIG. 1, there is illustrated an educational apparatus in accordance with the present invention designated generally by the numeral 10. This apparatus consists of a base or support member 12 having suitable means such as a plurality of walls or dividers, such as for example, 14 through 30 dividing the device into a plurality of tracks or channels. These tracks or channels 32 through 46 are each provided with indicia means divided into separate and distinct units of measure or value. In the illustrated system the primary division is that of proportional measure related to the metric system.

By way of example, the illustrated system is that of positive numerical values and each channel is selected to be one meter in length and the divisions thereof related directly to the length of a meter. For example, channel 32 is divided into millimeters, channel 34 into centimeters, channel 36 into decimeters, and channel 38 representative of the meter. Each of these may be further divided and the respective divisions thereof shown by various indicia designed to stimulate both the visual and the tactual senses. The more senses that are stimulated by a particular concept, the greater the understanding and retention of the concept. Thus, the system is designed to stimulate as many senses as possible as well as to repeat the stimulation as often as possible. Further units of measure are related to the basic unit of measure. For example, channel 40 or track 40 is divided into percentage related directly to the meter, channel 42 divided into decimal units and channel 44 divided into fractions. Other divisions are possible as well as other units of measure and other relationships. Channel 46, for example, is divided into the English unit or system of measure of inches and feet, and the relationship thereof with respect to the metric system is readily illustrated. Any number of the tracks may be utilized and they may be positioned as suitable or as desired.

Further visual as well as tactual stimuli is provided in the form of slots 48 formed at selected divisions of any of the respective separators or walls for a given track, such as 16 for example. The divisions may be selected for any suitable division of a particular track or channel. Other types or markers may also be used such as raised pin heads 50 as shown on divider 20. These again may be positioned as desirable.

Other indicators and comparative indicators such as a multiple track slider 52 may also be provided. This slider 52 may be used along or in conjunction with another slider substantially identical thereto with a space therebetween providing a hair line marker lining up the indicia on the respective tracks. Thus, a point or value on any particular track or scale thereon can be correlated with a particular value on an adjacent or a remotely adjacent scale. Equivalent divisions of all of the scales can be related thusly. Similarly, single track sliders or indicators 54 and 56 may also be provided for attachment to or use with specific scales. The design of the slider 54 is simply that of a pointer to point to a particular value on a scale. The design of the slider 56 is such that it may be used in conjunction with a plurality of blocks as indicated in FIGS. 4 through 7 having particular values which may be added to values on a particular scale.

As seen in FIGS. 4 and 5, shims of various thicknesses, such as shim 58 and 60 of FIGS. 4 and 5 respectively, of values such as 1 millimeter and 5 millimeters may be utilized. These may be utilized in conjunction with the millimeter and centimeter scales, wherein a particular value on the scale is selected and other values are to be added thereto. These blocks or shims are also valuable in permitting the student to feel what the particular dimension is that he is concerned with. In other words, a student can feel an item of one millimeter thickness and thereby having both visual and tactual stimulus as to that value. Similarly, for other values as in FIG. 5. Other blocks of other values related to the scales of the particular apparatus may also be utilized. For example, in FIG. 6 a one centimeter block 62 is illustrated. Similarly, in FIG. 7, a 5 centimeter block 64 is illustrated. These represent the respective values.

The values represented by a block may be independent or co-joined. A multiple number of the blocks or shims should be available for the students use in learning various values of the numerical system as well as relationships between the various numbers. Additionally, the scales may be used in conjunction with the blocks for teaching mathematical concept, such as addition and subtraction. The scales may also be modified such that multiplication and/or division may also be possible.

Turning now to FIG. 8, various modifications of the system may be provided in order to increase the utility thereof. For example, a plus and minus scales 66 and 68 may be provided to illustrate the concept of negative values as well as the relationship between negative and positive values. Other relationships and concepts are also possible within the concept of the present invention.

In use of the present apparatus, multiple numerical and proportional concepts and the relationships therebetween may be readily and conveniently taught by the present apparatus. The relative values of the various scales on the apparatus are readily apparent and need no further explanation. Addition and subtraction can be readily taught on one or more of the scales of the apparatus simply by the use of markers or sliders 54 and 56 in combination with one or more of the blocks 58 through 64. Additional sliders such as 52 may also be used. Various combinations may be utilized for the teaching and illustrating the concept of addition and subtraction and other concepts. For example, a value such as for example 20 centimeters may be selected and the student asked to add to that value 6 centimeters and asked then to determine the sum. The student may go about it in several ways, such as placing a slider or marker such as 54 and 56 on the first number 20 and selecting blocks such as 62 and 64 to make up for the additional numbers added to the particular first number gives the indication of the value of the total numbers. A similar approach can be taken for addition utilizing either one of the markers, or markers in combination with the blocks.

The system of tracks may be mounted in either a horizontal or a vertical plane. The tracks may also extend either horizontally or vertically.

Thus, it can be seen that with the invention of the present apparatus, many numerical and mathematical concepts may be readily taught and demonstrated within the scope of the present invention without departing from the spirit and scope thereof as defined in the appended claims.

Having described my invention, I now claim:

1. An educational system comprising in combination:
   a plurality of individual tracks of the same length disposed side by side and extending parallel,
   indicia means dividing each of said tracks into different units of measure,
   one of said tracks is divided into centimeters,
   another of said tracks is divided into percentage units,
   a further track is divided into fractions,
   a slide indicator spanning a plurality of said tracks, and
   a plurality of individual blocks, at least a plurality of which are of different sizes, at least one of each of said different size blocks corresponding to at least one of said different units of measure for fitting into said channels for providing additional stimulus of units of measure.

2. The educational system of claim 1, wherein a plurality of said tracks are divided into different units of the metric system, and
   at least one of said tracks is divided into units of the English system of measurement.

3. The educational system of claim 1, wherein said tracks are separated by a plurality of walls, said walls including visual and tactual indicia corresponding to units of measure defined by an adjacent track.

4. The educational system of claim 3, wherein said visual and tactual indicia comprises a plurality of slots in said walls.

5. The educational system of claim 3, wherein said visual and tactual indicia comprises a raised head pin mounted in said wall.

6. An educational system comprising in combination:

a plurality of individual tracks of one meter in length, separated by a plurality of walls disposed side by side and extending parallel, said walls including visual and tactual indicia corresponding to units of measure defined by an adjacent track, one of said tracks is divided into centimeters, another of said tracks is divided into percentage units, a further track is divided into fractions, indicia means dividing each of said tracks into different units of measure, a plurality of individual blocks of sizes corresponding to at least a plurality of said units of measure for fitting into said channels for providing additional stimulus of units of measure, and a plurality of indicators slidably mounted on separate ones of said walls.

7. The educational system of claim 6, wherein one of said indicators comprises mounting means for mounting one or more of said blocks.

8. The educational system of claim 7, wherein said track includes a negative portion.

9. The educational system of claim 8, comprising eight tracks, each track divided into different units of measure.

* * * * *